(12) United States Patent
Castaño Meneses

(10) Patent No.: US 10,316,215 B2
(45) Date of Patent: Jun. 11, 2019

(54) NANO-ENGINEERED, HALOGEN-FREE, SUPER OMNIPHOBIC COATINGS

(71) Applicant: NanoTech Innovations Corporation, McAllen, TX (US)

(72) Inventor: Victor Manuel Castaño Meneses, Queretaro (MX)

(73) Assignee: NanoTech Innovations Corporation, McAllen, TX (US)

( * ) Notice: Subject to any disclaimer, the term of this patent is extended or adjusted under 35 U.S.C. 154(b) by 0 days.

(21) Appl. No.: 15/515,448

(22) PCT Filed: Sep. 29, 2015

(86) PCT No.: PCT/US2015/053054
§ 371 (c)(1),
(2) Date: Apr. 17, 2017

(87) PCT Pub. No.: WO2016/054121
PCT Pub. Date: Apr. 7, 2016

(65) Prior Publication Data
US 2017/0260420 A1 Sep. 14, 2017

Related U.S. Application Data
(60) Provisional application No. 62/057,205, filed on Sep. 29, 2014.

(51) Int. Cl.
| | |
|---|---|
| *C08K 3/04* | (2006.01) |
| *C08K 3/22* | (2006.01) |
| *C09D 5/00* | (2006.01) |
| *C09D 5/14* | (2006.01) |
| *C09D 5/32* | (2006.01) |
| *C09D 7/40* | (2018.01) |
| *C09D 7/61* | (2018.01) |
| *C04B 41/45* | (2006.01) |
| *C04B 41/49* | (2006.01) |
| *C04B 41/50* | (2006.01) |
| *C04B 103/40* | (2006.01) |
| *C04B 103/44* | (2006.01) |
| *C04B 103/50* | (2006.01) |
| *C09D 183/04* | (2006.01) |

(52) U.S. Cl.
CPC ........ *C09D 183/04* (2013.01); *C04B 41/4961* (2013.01); *C09D 5/00* (2013.01); *C09D 5/14* (2013.01); *C09D 5/32* (2013.01); *C09D 7/61* (2018.01); *C09D 7/67* (2018.01); *C08K 3/04* (2013.01); *C08K 3/22* (2013.01); *C08K 2003/2296* (2013.01)

(58) Field of Classification Search
CPC ... C09D 183/04; C09D 7/1266; C09D 7/1225
See application file for complete search history.

(56) References Cited

U.S. PATENT DOCUMENTS

| | | | | |
|---|---|---|---|---|
| 6,593,417 | B1 * | 7/2003 | Anderson | B82Y 30/00 524/588 |
| 9,028,958 | B2 * | 5/2015 | Mao | B82Y 30/00 427/373 |
| 2003/0207985 | A1 * | 11/2003 | Anderson | B82Y 30/00 524/588 |
| 2006/0263516 | A1 * | 11/2006 | Jones | C03C 17/007 427/180 |
| 2007/0009657 | A1 * | 1/2007 | Zhang | C09D 183/04 427/180 |
| 2007/0266896 | A1 * | 11/2007 | Suwa | C09D 5/006 106/287.16 |
| 2008/0090004 | A1 * | 4/2008 | Zhang | C09D 4/00 427/180 |
| 2008/0221263 | A1 * | 9/2008 | Kanagasabapathy | C09D 5/1618 524/588 |
| 2008/0250978 | A1 * | 10/2008 | Baumgart | C09D 5/008 106/287.19 |
| 2009/0064894 | A1 * | 3/2009 | Baumgart | C09D 1/00 106/18.32 |
| 2009/0136741 | A1 * | 5/2009 | Zhang | B08B 17/06 428/328 |
| 2010/0004353 | A1 * | 1/2010 | Desai | C09D 7/1225 523/210 |
| 2010/0004373 | A1 * | 1/2010 | Zhu | C09D 133/08 524/448 |
| 2010/0183864 | A1 * | 7/2010 | Qi | B82Y 30/00 428/319.1 |
| 2011/0084421 | A1 * | 4/2011 | Soane | C09D 7/005 264/219 |
| 2011/0165415 | A1 * | 7/2011 | Ma | C08J 7/16 428/341 |

(Continued)

FOREIGN PATENT DOCUMENTS

WO    WO-2012156172 A1 * 11/2012 ............... C09D 7/61

*Primary Examiner* — Liam J Heincer
(74) *Attorney, Agent, or Firm* — Gary M. Myles; Myles Intellectual Property Law

(57) ABSTRACT

Provided are halogen-free coatings, and methods for making and using such halogen-free coatings, for water and oil protection or repellants, which coatings control and/or eliminate the effect of humidity and oily substances on one or more of a variety of surfaces. These coatings and methods exhibit minimal toxicity to humans, non-human animals, including pets, and the environment more generally. The presently-disclosed coatings, which do not contain a halogen component, may be suitably employed, for example, on monuments, textiles, metals, stone, ceramic, wood, or other surface.

20 Claims, 2 Drawing Sheets

(56) References Cited

U.S. PATENT DOCUMENTS

| | | | |
|---|---|---|---|
| 2011/0229667 A1* | 9/2011 | Jin | B81C 1/00206 428/34.1 |
| 2011/0263751 A1* | 10/2011 | Mayer | C09D 5/1618 523/177 |
| 2012/0045954 A1* | 2/2012 | Bleecher | C09D 7/1225 442/80 |
| 2012/0142814 A1* | 6/2012 | Kanagasabapathy | C08K 3/36 523/175 |
| 2012/0264884 A1* | 10/2012 | Liu | C08F 297/026 525/276 |
| 2013/0064990 A1* | 3/2013 | Lu | B82Y 30/00 427/535 |
| 2013/0112379 A1* | 5/2013 | Ko | C09D 7/1216 165/133 |
| 2013/0115381 A1* | 5/2013 | Schwartz | B05D 5/083 427/535 |
| 2013/0251948 A1* | 9/2013 | Lyons | B32B 5/16 428/148 |
| 2014/0011013 A1* | 1/2014 | Jin | B05D 5/08 428/297.4 |
| 2014/0087134 A1* | 3/2014 | Gesford | C09D 175/04 428/141 |
| 2014/0094540 A1* | 4/2014 | Simpson | C09D 5/031 523/200 |
| 2014/0162022 A1* | 6/2014 | Nowak | C09D 5/00 428/145 |
| 2014/0205804 A1* | 7/2014 | Jones | B65D 83/752 428/141 |
| 2014/0212592 A1* | 7/2014 | Sunder | C09D 5/1618 427/427 |
| 2014/0272301 A1* | 9/2014 | Gross | C09D 5/00 428/149 |
| 2014/0296409 A1* | 10/2014 | Sikka | C09D 5/021 524/365 |
| 2014/0309343 A1* | 10/2014 | Venema | B01J 2/00 524/71 |
| 2015/0017386 A1* | 1/2015 | Kolb | C08J 7/047 428/149 |
| 2015/0053611 A1* | 2/2015 | Wang | B01D 71/64 210/500.23 |
| 2015/0307759 A1* | 10/2015 | Bordoloi | C08K 5/41 524/56 |
| 2016/0060466 A1* | 3/2016 | Castano Meneses | C09D 5/103 524/773 |
| 2016/0075883 A1* | 3/2016 | Ebert | C09D 183/04 427/601 |
| 2017/0015843 A1* | 1/2017 | Liu | B32B 7/12 |
| 2017/0058131 A1* | 3/2017 | Sigmund | C09D 5/1681 |

* cited by examiner

FIG. 1
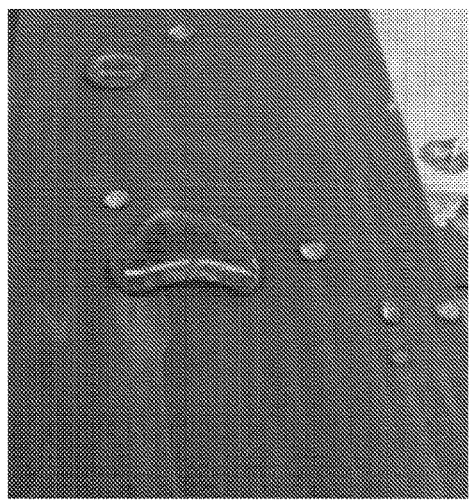
FIG. 1A
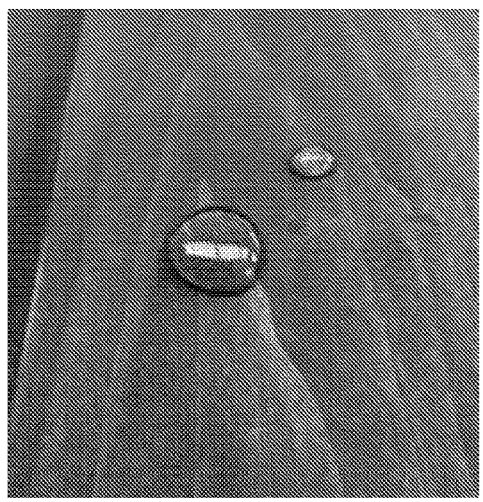
FIG. 1B
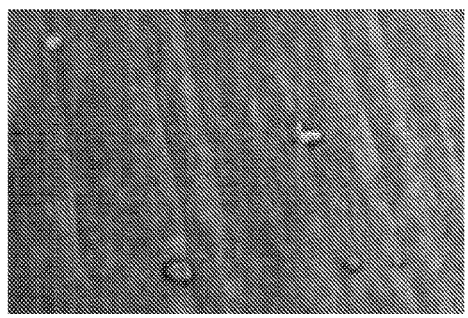
FIG. 1C
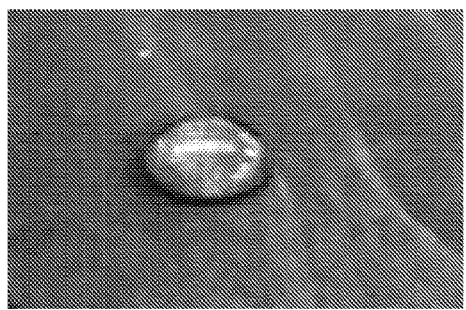
FIG. 1D

NANO-ENGINEERED, HALOGEN-FREE, SUPER OMNIPHOBIC COATINGS

CROSS-REFERENCE TO RELATED APPLICATIONS

This U.S. Non-provisional patent application, which was filed on Mar. 29, 2017, claims priority under 35 U.S.C. § 371 to PCT Patent Application No. PCT/US2015/053054, which was filed on Sep. 29, 2015 and claims the benefit of U.S. Provisional Patent Application No. 62/057,205, which was filed on Sep. 29, 2014. The entirety of PCT Patent Application No. PCT/US2015/053054 and U.S. Provisional Patent Application No. 62/057,205 is incorporated herein by reference.

BACKGROUND OF THE DISCLOSURE

Technical Field

The present disclosure relates, generally, to the development of alternative coatings and methods for water and oil protection or repellants, to control and/or eliminate the effect of humidity and oily substances on various surfaces. These coatings, which are halogen-free, exhibit little to no toxicity to humans, non-human animals, including pets and other domesticated animals, and, therefore, may be safely employed for use on monuments, textiles, metals, stone, ceramic, wood, and other surfaces and when otherwise exposed to the environment.

Description of the Related Art

Coatings are usually applied for protecting surfaces from water, oil, and/or dirt. A variety of hydrophobic and oleophobic surface coating compositions have been described, must of them containing an halogen or derivative, which are normally used to produce very low surface energies and, thus, impinge the hydrophobic property on a surface, as in U.S. Pat. No. 6,663,941, which discloses hydrophobic coating compositions and processes for coating articles with such hydrophobic coating compositions. The authors claim there that durable, weatherable and scratch-resistant coatings are provided by compositions comprising a trifluoromethyl-containing component and a hardenable material. However, they also state that forming hydrophobic coatings on articles involves no substantial loss of fluorocarbon solvent used in the coating composition. As a result, their technology forms an exposed surface populated with 30% by area or more terminal trifluoromethyl groups. In other words, they strongly rely on both, hazardous solvents and fluorine-containing substances, which are known to be highly detrimental to the environment. Most patents and commercial products that claim hydrophobic and/or lipophobic properties, rely on fluorine or derivatives.

U.S. Pat. No. 5,476,717 describes a material having anti-reflective, hydrophobic, and abrasion-resistant properties. The '717 patent also relates to a process for depositing an anti-reflective, hydrophobic, and abrasion-resistant material on an organic or inorganic substrate. The material process described in the '717 patent requires the use of an adhesion-promoting coating, which permits the active reinforcement of the mixing of the anti-reflection coating to the substrate. The material described in the '717 patent is designed specifically for use with optical components, but not for large scale industrial applications, and requires use of a primer, which includes an adhesion promoter agent and requires pretreatment of the surface to be coated.

Attempts have been made to provide alternatives for reducing the surface energy of a coating, such as the halogen-free coatings that are described in PCT Patent Publication No. WO 1995/008515, which are made in aqueous solution by polymerizing an amino-oxysilane having at least one primary amine group to control pH and water solubility. The '515 PCT relates exclusively, however, to the formation of a high performance binder for use in inorganic protective coatings to enhance the coating's weather, heat, and chemical resistance and to provide a flat or glossy surface finish as well as a zinc rich composition that can be used exclusively as a component of a paint or coating formulation (i.e., as a binder), including epoxy, polyurethane, silicone, silicate, acrylic, vinyl, alkyd, chlorinated rubber, and the like. The '515 PCT further the polymerization in water of their components, which involves curing time and control of the reaction conditions.

U.S. Patent Publication No. 2003/0147932 described the physical nanostructuring of a coating composition, by forming a nanoemulsion, and the patterning of the surface to be protected to achieve a lotus-effect surface comprising a substrate having a surface and a plurality of irregularities associated with said surface wherein the lotus-effect surface comprises at least one anti-microbial material. The surface described in the '932 publication comprises particles having an irregular fine nanostructure, wherein the irregularities comprise a mixture of one or more types of hydrophobic particles and one or more types of anti-microbial particles. The '932 publication is, however, restricted to anti-microbial properties and does not contribute a hydrophobic or lipophobic behavior to the coated surface.

SUMMARY OF THE DISCLOSURE

Within certain embodiments, the present disclosure provides coating compositions having super hydrophobic and super lipophobic properties, which coating compositions comprise a nanostructure including a halogen- and solvent-free water-borne substance. Within certain aspects, the coating compositions comprise a nanostructured mixture of one or more organic substances and one or more ceramic nanoparticles. Within other aspects, the coating compositions comprise one or more organic or inorganic additives wherein each additive is independently selected from the group consisting of a binder, a coupling agent, a thickener, a dispersant, a surfactant, a de-foamer, a rheological agent, and a stabilizer.

Suitable ceramic nanoparticles for use in the coating compositions disclosed herein may be selected from the group consisting of a functionalized zinc oxide nanoparticle, a functionalized carbonaceous nanoparticle, and a functionalized silicon oxide nanopowder. Within certain aspects, the ceramic nanoparticle can comprise from about 0.05% to about 1.5% of the total weight of the composition. Within other aspects, the nanostructures may be from about 1 nm to about 100 nm. Within yet further aspects, coating compositions may further comprise an anti-UV property and/or an anti-bacterial property.

These and other aspects of the present compositions and methods for making and using those compositions are described in further detail herein.

BRIEF DESCRIPTION OF DRAWINGS

FIGS. 1A-1D are photographs that show a wooden surface uncoated (FIGS. 1A and 1C) and coated (FIGS. 1B and 1D) with a composition according to the present disclosure.

DETAILED DESCRIPTION

Figure 2:
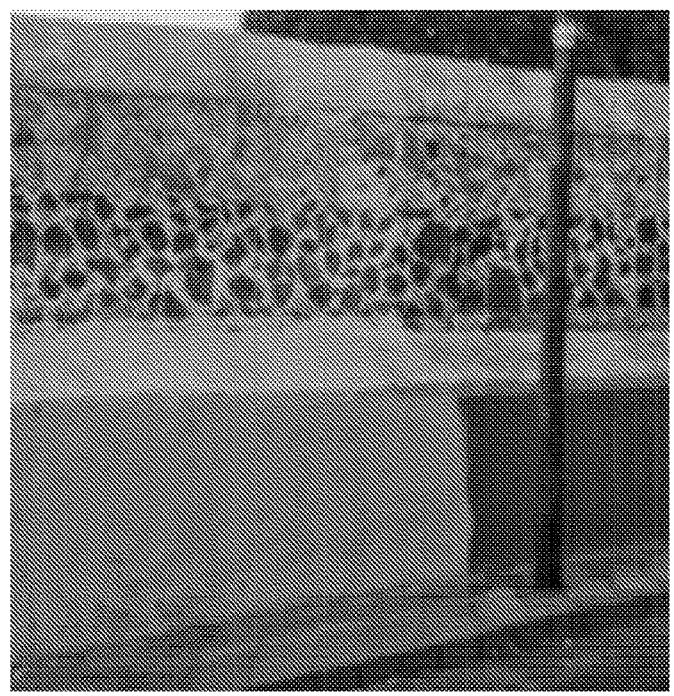
FIG. 2 is a photograph showing a stone and concrete wall wherein the left side was coated with a composition according to the present disclosure, and the right side remains uncoated.

These and other aspects of the present disclosure can be better understood by reference to the following non-limiting definitions.

Definitions

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter. As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

It will be understood that, unless indicated to the contrary, terms intended to be "open" (e.g., the term "including" should be interpreted as "including but not limited to," the term "having" should be interpreted as "having at least," the term "includes" should be interpreted as "includes but is not limited to," etc.). Phrases such as "at least one," and "one or more," and terms such as "a" or "an" include both the singular and the plural. Following long-standing patent law convention, the terms "a", "an", and "the" refer to "one or more" when used in this application, including the claims. Thus, for example, reference to "a nanoparticle" includes a plurality of such nanoparticles, and so forth. The term "or" is an inclusive "or" unless indicated otherwise.

Conditional language, for example, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

It will be further understood that where features or aspects of the disclosure are described in terms of Markush groups, the disclosure is also intended to be described in terms of any individual member or subgroup of members of the Markush group.

All references cited herein, whether supra or infra, including, but not limited to, patents, patent applications, and patent publications, whether U.S., PCT, or non-U.S. foreign, and all technical and/or scientific publications are hereby incorporated by reference in their entirety.

Nanostructures, Nanostructured Mixtures of Nanostructures, and Super Omniphobic Coating Compositions Thereof Within certain embodiments, the present disclosure provides nanostructures and nanostructured mixtures of nanostructures, which nanostructures are prepared with one or more water-soluble compounds and in the absence of halogens or non-aqueous solvents. Also provided are super hydrophobic and super lipophobic (collectively, super omniphobic) coating compositions that comprise one or more nanostructures, or one or more nanostructured mixtures thereof, wherein the nanostructures and nanostructured mixtures are prepared with one or more water-soluble compounds and in the absence of halogens or non-aqueous solvents.

Within other embodiments, the present disclosure provides nanostructures and nanostructured mixtures comprising one or more organic compounds and one or more nanoparticles such as, for example, one or more ceramic nanoparticles, which nanostructured mixtures form stable and clear suspensions. Also provided are super hydrophobic and super lipophobic coating compositions, which coating compositions comprise nanostructured mixtures of one or more organic compounds and one or more nanoparticles such as, for example, one or more ceramic nanoparticles and which nanostructured mixtures form stable and clear suspensions.

Within certain aspects, nanoparticles, including ceramic nanoparticles, which may be advantageously employed in the preparation of the presently disclosed nanostructures, nanostructured mixtures, and super hydrophobic and super lipophobic coating compositions, may be selected, without limitation, from the group consisting of zinc oxide nanoparticles, silicon oxide nanoparticles, carbonaceous nanoparticles, and mixtures comprising one or more zinc oxide nanoparticles, silicon oxide nanoparticles, or carbonaceous nanoparticles. It will be understood that the present disclosure contemplates nanoparticles having a variety of different structures.

Suitable nanoparticles for use in preparing the presently disclosed nanostructures, nanostructured mixtures, and super hydrophobic and super lipophobic coating compositions may have particle diameters of from 0.5 to 200 nm, or from 1 nm to 100 nm, or from 2 nm to 50 nm, or from 5 nm to 20 nm and may be present in such nanostructured mixtures and super hydrophobic and super lipophobic coating compositions may comprise from 0.05 to 1.5% by weight, or from 0.1 to 1.25% by weight, or from 0.2 to 1.0% by weight of the nanostructured mixtures or coating compositions thereof.

Within certain aspects, the presently disclosed nanoparticles may be functionalized with one or more chemical moieties, which chemical moieties may comprise one or more functional groups that are selected from the group consisting of hydroxyl groups, carboxyl groups, and amino groups.

Within other aspects, the presently disclosed super hydrophobic and super lipophobic coating compositions may comprise polydimethylsiloxane and one or more nanoparticles such as, for example, one or more ceramic nanoparticles wherein each of said one or more ceramic nanoparticles is independently selected from the group consisting of functionalized zinc oxide nanoparticles, functionalized carbonaceous nanoparticles, functionalized silicon oxide nanoparticles, and mixtures comprising one or more zinc oxide nanoparticles, silicon oxide nanoparticles, or carbonaceous nanoparticles.

Within further aspects, the presently disclosed super hydrophobic and super lipophobic coating compositions may further comprise one or more organic or inorganic additives, which additives may, for example, be selected from the group consisting of binders, coupling agents, thickeners, dispersants, surfactants, antifoams, defoamers, rheological modifiers, stabilizers, and mixtures thereof.

Exemplary suitable additives that may be employed in the super hydrophobic and super lipophobic coating compositions disclosed herein may include, for example, one or more antifoams, which antifoams are selected from the group consisting of fatty acid amides, higher molecular weight polyglycols, fatty acid esters, fatty acid ester amides, polyalkylene glycols, organophosphates, metallic soaps of fatty acids, silicone oils, hydrophobic silica, organic polymers, saturated fatty acids, unsaturated fatty acids, sulfonated fatty acids, higher alcohols (e.g., octyl to oleyl).

Exemplary suitable thickeners that may be employed in the super hydrophobic and super lipophobic coating compositions disclosed herein may include, for example, one or more thickeners selected from the group consisting of Methocel, Natrosol, Cellosize, Bermocoll, Aquathix, Attagel, Acrysol, Collacral, Ucar, Modicol; and dispersants such as Calgon, Colloid, Darvan, Nopcosant, Nopcosperse, Nuosperse, Polywet, Tamol, and Texigel.

Within certain embodiments, the presently disclosed super hydrophobic and super lipophobic coating compositions may include one or more of polydimethylsiloxane, Defoamer Colloid 643, hydroxyethylcellulose, Natrosol®, and Tamol 963®.

The super hydrophobic and super lipophobic coating compositions disclosed herein provide certain unexpected advantages over other coating compositions that are known in the art. For example, the presently disclosed super hydrophobic and super lipophobic coating compositions are easy to apply and do not require the use of a primer, an adhesion promoter agent, or a complex pretreatment of the surface to be coated.

Moreover, in certain aspects, the super hydrophobic and super lipophobic coating compositions disclosed herein exhibit strong UV protection to the surface upon which the coating composition is applied. Within other aspects, the super hydrophobic and super lipophobic coating compositions exhibit antibacterial properties such as, for example, bacteriostatic or bactericidal properties, which antibacterial properties are effective in reducing, preventing, or eliminating bacterial contamination on the surface upon which the coating composition is applied.

The super hydrophobic and super lipophobic coating compositions disclosed herein provide other unexpected advantages over other coating compositions that are known in the art. For example, in certain aspects, the super hydrophobic and super lipophobic coating compositions provide one or more advantages selected from the group consisting of increased durability, increased erosion-resistance, ease of or self-cleaning, lotus effect, transparency, and imperceptibility.

Within other embodiments, the present disclosure provides methods for the manufacture or preparation of the super hydrophobic and super lipophobic coating compositions described herein. Certain aspects of these methods comprise: (1) producing a nano-emulsion comprising one or more surfactants and one or more silicon or metal-containing organic molecules and (2) adding to the nanoemulsion one or more nanoparticles, such as, for example, one or more ceramic nanoparticles. Within other aspects, the one or more nanoparticles may be added to the nano-emulsion by careful and controlled mechanical stirring. Within further aspects, the presently disclosed methods further comprise adding one or more stabilizers or one or more other additives to the nanoparticle-nanoemulsion mixture.

The super hydrophobic and super lipophobic coating compositions disclosed herein may be advantageously applied to monuments, textiles, metals, stone, ceramic, wooden, and other surfaces to yield coated surfaces that are harmless to the surface; to people, pets, and other animals exposed to the coated surfaces, and to the environment.

While various embodiments have been disclosed herein, other embodiments will be apparent to those skilled in the art. The various embodiments disclosed herein are for purposes of illustration and are not intended to be limiting, with the true scope and spirit being indicated by the claims.

EXAMPLES

Example 1

Super Hydrophobic and Super Lipophobic Coating Compositions

This Example discloses exemplary super hydrophobic and super lipophobic coating compositions as described herein and presents in FIGS. 1 and 2 the advantageous use of those exemplary super hydrophobic and super lipophobic coating compositions on various surfaces.

Tables 1-5 provides illustrative and non-limiting examples of a super hydrophobic and super lipophobic coating compositions according to the present disclosure.

TABLE 1

A First Exemplary Super Hydrophobic and Super Lipophobic Coating Composition

| Raw Material | Mass (kg) | wt % |
|---|---|---|
| Functionalized zinc oxide nanoparticles | 0.0018 | 0.09% |
| Functionalized carbonaceous nanoparticles | 0.0005 | 0.02% |
| Polydimethylsiloxane | 0.89 | 44.43% |
| Water | 1 | 49.92% |
| Defoamer (Colloid 643) | 0.015 | 0.75% |
| Thickener (Natrosol) | 0.08 | 3.99% |
| Dispersant (Tamol 963) | 0.006 | 0.30% |
| 99% Functionalized Silicon Oxide NanoPowder | 0.01 | 0.50% |
| Total | 2.0033 | 100.00% |

TABLE 2

A Second Exemplary Super Hydrophobic and Super Lipophobic Coating Composition

| Raw Material | Mass (kg) | wt % |
| --- | --- | --- |
| Functionalized carbonaceous nanopartcles | 0.0005 | 0.03% |
| Polydimethylsiloxane | 0.89 | 44.47% |
| Water | 1 | 49.96% |
| Defoamer (Colloid 643) | 0.015 | 0.75% |
| Thickener (Natrosol) | 0.08 | 4.00% |
| Dispersant (Tamol 963) | 0.006 | 0.30% |
| 99% Functionalized Silicon Oxide Nanopowder | 0.01 | 0.50% |
| Total | 2.0015 | 100.00% |

TABLE 3

A Third Exemplary Super Hydrophobic and Super Lipophobic Coating Composition

| Raw Material | Mass (kg) | wt % |
| --- | --- | --- |
| Functionalized carbonaceous nanopartcles | 0.0005 | 0.03% |
| Polydimethylsiloxane | 1 | 49.96% |
| Water | 0.89 | 44.47% |
| Defoamer (Colloid 643) | 0.02 | 1.00% |
| Thickener (Natrosol) | 0.075 | 3.75% |
| Dispersant (Tamol 963) | 0.006 | 0.30% |
| 99% Functionalized Silicon Oxide Nanopowder | 0.01 | 0.50% |
| Total | 2.0015 | 100.00% |

TABLE 4

A Fourth Exemplary Super Hydrophobic and Super Lipophobic Coating Composition

| Raw Material | Mass (kg) | wt % |
| --- | --- | --- |
| Functionalized carbonaceous nanopartcles | 0.0005 | 0.03% |
| Polydimethylsiloxane | 1.25 | 62.45% |
| Water | 0.65 | 32.48% |
| Defoamer (Colloid 643) | 0.01 | 0.50% |
| Thickener (Natrosol) | 0.075 | 3.75% |
| Dispersant (Tamol 963) | 0.006 | 0.30% |
| 99% Functionalized Silicon Oxide Nanopowder | 0.01 | 0.50% |
| Total | 2.0015 | 100.00% |

TABLE 5

A Fifth Exemplary Super Hydrophobic and Super Lipophobic Coating Composition

| Raw Material | Mass (kg) | wt % |
| --- | --- | --- |
| Functionalized carbonaceous nanopartcles | 0.0005 | 0.03% |
| Polydimethylsiloxane | 1.5 | 74.94% |
| Water | 0.415 | 20.73% |
| Defoamer (Colloid 643) | 0.0055 | 0.28% |
| Thickener (Natrosol) | 0.0645 | 3.22% |
| Dispersant (Tamol 963) | 0.006 | 0.30% |
| 99% Functionalized Silicon Oxide Nanopowder | 0.01 | 0.50% |
| Total | 2.0015 | 100.00% |

Exemplary suitable nanoparticles for preparing the super hydrophobic and super lipophobic coating compositions disclosed herein include silica nanoparticles such as, for example, Silicon Oxide NanoPowders (American Elements, 2013), Silica nanoparticles, and nanodots, which are high surface area particles.

Nanoscale Silicon Oxide Nanoparticles or Silica Particles may be from about 5 nanometers (nm) to about 100 nm with a specific surface area (SSA) of from 25 $m^2/g$ to 50 $m^2/g$. Nano Silicon Oxide Particles are available in ultra-high purity, high purity, coated, hydrophilic, lipophilic, and dispersed forms.

The foregoing description is intended to illustrate and not limit the scope of the present disclosure. Other aspects, advantages and modifications are within the scope of the following claims.

What is claimed is:

1. A halogen-free super hydrophobic and super lipophobic coating composition, said coating composition comprising polydimethylsiloxane and functionalized carbonaceous nanoparticles,
    wherein said functionalized carbonaceous nanoparticles are present in said composition at a concentration by weight of from about 0.02% to about 0.03% and
    wherein said composition is devoid of halogens including chlorine, bromine, fluorine, and iodine.

2. The halogen-free super hydrophobic and super lipophobic coating composition of claim 1 wherein said polydimethylsiloxane is present in said composition at a concentration by weight of from about 44% to about 75%.

3. The halogen-free super hydrophobic and super lipophobic coating composition of claim 1 wherein said polydimethylsiloxane is present in said composition at a concentration by weight of from about 44% to about 50%.

4. The halogen-free super hydrophobic and super lipophobic coating composition of claim 1 wherein said polydimethylsiloxane is present in said composition at a concentration, by weight of from about 62% to about 75%.

5. A halogen-free super hydrophobic and super lipophobic coating composition, said coating composition comprising polydimethylsiloxane and functionalized zinc oxide nanoparticles,
    wherein said functionalized zinc oxide nanoparticles are present in said composition at a concentration by weight of about 0.09% and
    wherein said composition is devoid of halogens including chlorine, bromine, fluorine, and iodine.

6. The halogen-free super hydrophobic and super lipophobic coating composition of claim 5 wherein said polydimethylsiloxane is present in said composition at a concentration by weight of from about 44% to about 75%.

7. The halogen-free super hydrophobic and super lipophobic coating composition of claim 5 wherein said polydimethylsiloxane is present in said composition at a concentration by weight of from about 44% to about 50%.

8. The halogen-free super hydrophobic and super lipophobic coating composition of claim 5 wherein said polydimethylsiloxane is present in said composition at a concentration by weight of from about 62% to about 75%.

9. A halogen-free super hydrophobic and super lipophobic coating composition, said coating composition comprising polydimethylsiloxane, one or more ceramic nanoparticles, and functionalized silicon oxide nanopowder,
wherein said functionalized silicon oxide nanopowder is present in said composition at a concentration by weight of about 0.5% and
wherein said composition is devoid of halogens including chlorine, bromine, fluorine, and iodine.

10. The halogen-free super hydrophobic and super lipophobic coating composition of claim 9 wherein said polydimethylsiloxane is present in said composition at a concentration by weight of from about 44% to about 75%.

11. The halogen-free super hydrophobic and super lipophobic coating composition of claim 9 wherein said polydimethylsiloxane is present in said composition at a concentration by weight of from about 44% to about 50%.

12. The halogen-free super hydrophobic and super lipophobic coating composition of claim 9 wherein, said polydimethylsiloxane is present in said composition at a concentration by weight of from about 62% to about 75%.

13. The halogen-free super hydrophobic and super lipophobic coating composition of claim 9 wherein said ceramic nanoparticles are functionalized carbonaceous nanoparticles that are present in said composition at a concentration by weight of from about 0.02% to about 0.03%.

14. The halogen-free super hydrophobic and super lipophobic coating, composition of claim 9, further comprising functionalized zinc oxide nanoparticles at a concentration by weight of about 0.09%.

15. A halogen-free super hydrophobic and super lipophobic coating composition, said coating composition comprising polydimethylsiloxane, functionalized carbonaceous nanoparticles, and functionalized silicon oxide nanopowder,
wherein said polydimethylsiloxane is at a concentration by weight of from about 44% to about 75%,
wherein said functionalized carbonaceous nanoparticles are at a concentration by weight of from about 0.02% to about 0.03%,
wherein said functionalized silicon oxide nanopowder is at a concentration by weight of about 0.5%, and
wherein said composition is devoid of halogens including chlorine, bromine, fluorine, and iodine.

16. The halogen-free super hydrophobic and super lipophobic coating composition of claim 15 wherein said polydimethylsiloxane is present in said composition at a concentration by weight of from about 44% to about 50%.

17. The halogen-free super hydrophobic and super lipophobic coating composition of claim 15 wherein said polydimethylsiloxane is present in said composition at a concentration by weight of from about 62% to about 75%.

18. A halogen-free super hydrophobic and super lipophobic coating composition, said coating composition comprising polydimethylsiloxane, functionalized carbonaceous nanoparticles, functionalized zinc oxide nanoparticles, and functionalized silicon oxide nanopowder,
wherein said polydimethylsiloxane is at a concentration by weight of from about 44% to about 75%,
wherein said functionalized carbonaceous nanoparticles are at a concentration by weight of from about 0.02% to about 0.03%,
wherein said functionalized zinc oxide nanoparticles are at a concentration by weight of about 0.09%,
wherein said functionalized silicon oxide nanopowder is at a concentration by weight of about 0.5%, and
wherein said composition is devoid of halogens including chlorine, bromine, fluorine, and iodine.

19. The halogen-free super hydrophobic and super lipophobic coating composition of claim 18 wherein said polydimethylsiloxane is present in said composition at a concentration by weight of from about 44% to about 50%.

20. The halogen-free super hydrophobic and super lipophobic coating composition of claim 18 wherein said polydimethylsiloxane is present in said composition at a concentration by weight of from about 62% to about 75%.

* * * * *